(12) United States Patent
Negi

(10) Patent No.: US 6,928,089 B1
(45) Date of Patent: Aug. 9, 2005

(54) PATTERN SYNCHRONOUS CIRCUIT

(75) Inventor: Keiji Negi, Kanagawa (JP)

(73) Assignee: Ando Electric Co., Ltd., Kanagawa (JP)

( * ) Notice: Subject to any disclaimer, the term of this patent is extended or adjusted under 35 U.S.C. 154(b) by 749 days.

(21) Appl. No.: 09/723,194

(22) Filed: Nov. 27, 2000

(30) Foreign Application Priority Data

Nov. 29, 1999 (JP) .......................... P11-337871

(51) Int. Cl.⁷ ............................................. H04J 3/06
(52) U.S. Cl. ..................... 370/509; 370/517; 375/368
(58) Field of Search .................. 370/503, 509, 370/513, 514, 516, 517, 366; 375/368; 710/71

(56) References Cited

U.S. PATENT DOCUMENTS

| | | | | |
|---|---|---|---|---|
| 5,140,618 A | * | 8/1992 | Kinoshita et al. ........... | 375/368 |
| 5,313,500 A | * | 5/1994 | Rikiyama .................... | 375/365 |
| 5,710,774 A | * | 1/1998 | Suh et al. ................... | 370/513 |
| 5,974,104 A | * | 10/1999 | Dhara ......................... | 375/368 |
| 6,104,770 A | * | 8/2000 | Yama .......................... | 375/368 |
| 6,134,233 A | * | 10/2000 | Kay ............................ | 370/350 |
| 6,359,908 B1 | * | 3/2002 | Soda .......................... | 370/503 |
| 6,385,213 B1 | * | 5/2002 | Nakamura et al. ......... | 370/513 |
| 2003/0189954 A1 | * | 10/2003 | Miki et al. .................. | 370/509 |

* cited by examiner

Primary Examiner—Frank Duong
Assistant Examiner—Michael J. Moore
(74) Attorney, Agent, or Firm—Fish & Richardson P.C.

(57) ABSTRACT

Sort operations of an input signal are performed by providing a first sort part 6 comprising one shift circuit 8 and (l−1) sort circuits 9a to 9c, and a second sort part 7 comprising one delay circuit 10, (m−1) sort circuits 11a to 11c and m shift circuits 12a to 12d in a pattern synchronous circuit 100.

10 Claims, 8 Drawing Sheets

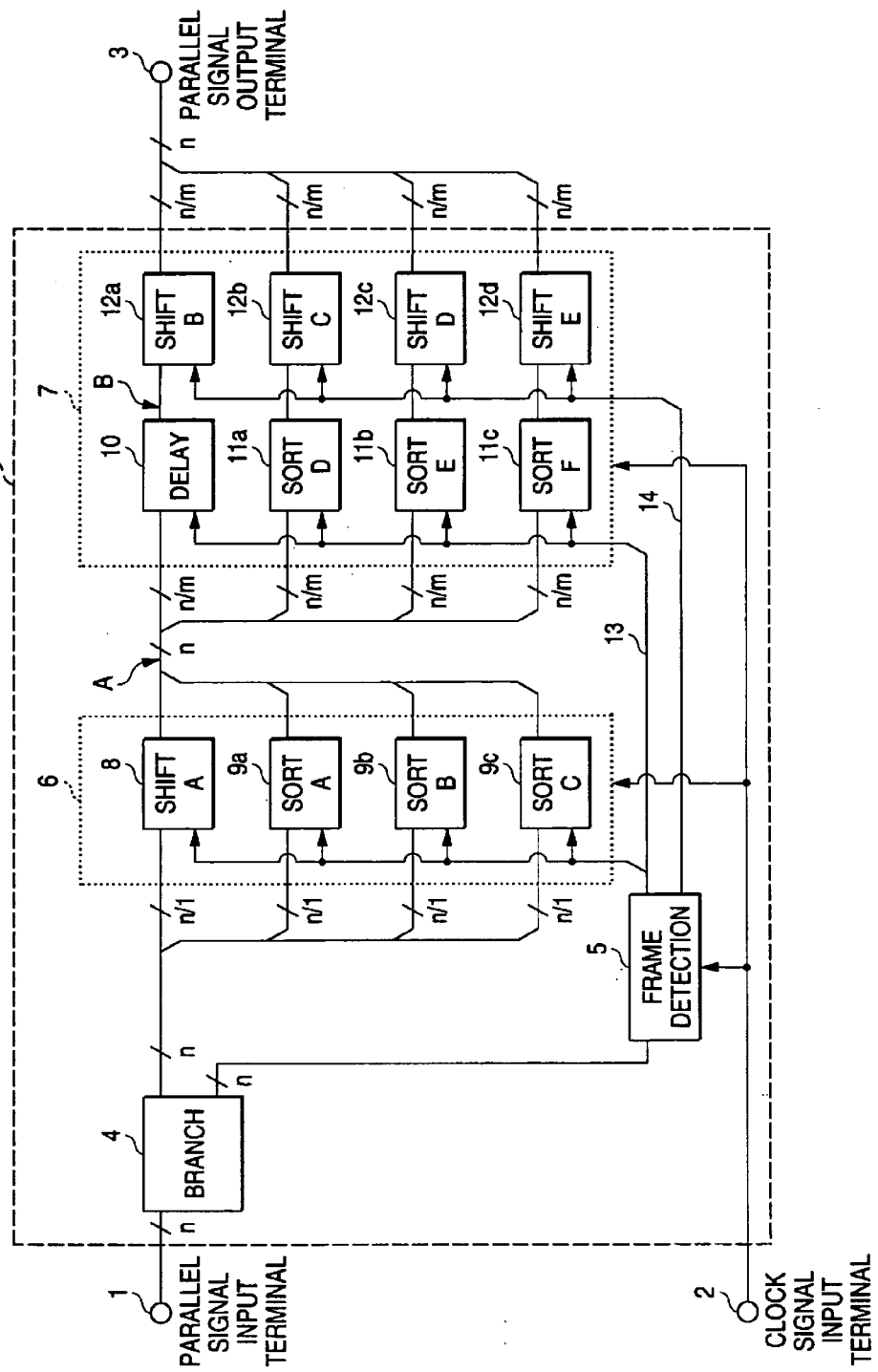

FIG. 2

TRUTH TABLE OF SHIFT CIRCUITS A TO E
(WHERE INPUT OF SORT CIRCUIT AND SHIFT CIRCUIT IS 4 BITS)

| INPUT | | | | | | OUTPUT | | | |
|---|---|---|---|---|---|---|---|---|---|
| D0 | D1 | D2 | D3 | SEL | CLK | Q0 | Q1 | Q2 | Q3 |
| A | B | C | D | 0 | ↑ | A | B | C | D |
| A | B | C | D | 1 | ↑ | B | C | D | A (+1) |
| A | B | C | D | 2 | ↑ | C | D | A (+1) | B (+1) |
| A | B | C | D | 3 | ↑ | D | A (+1) | B (+1) | C (+1) |

FIG. 3

TRUTH TABLE OF SORT CIRCUITS A TO C
(WHERE INPUT OF SORT CIRCUIT IS 4 BITS)

| INPUT | | | | | | OUTPUT | | | |
|---|---|---|---|---|---|---|---|---|---|
| D0 | D1 | D2 | D3 | SEL | CLK | Q0 | Q1 | Q2 | Q3 |
| A | B | C | D | 0 | ↑ | A | B | C | D |
| A | B | C | D | 1 | ↑ | B | C | D | A |
| A | B | C | D | 2 | ↑ | C | D | A | B |
| A | B | C | D | 3 | ↑ | D | A | B | C |

FIG. 4

TRUTH TABLE OF SORT CIRCUITS D TO F IN ENABLE
(WHERE INPUT OF 1 BIT SHIFT CIRCUIT IS 4 BITS)

| INPUT | | | | | OUTPUT | | | |
|---|---|---|---|---|---|---|---|---|
| D0 | D1 | D2 | D3 | CLK | Q0 | Q1 | Q2 | Q3 |
| A | B | C | D | ↑ | B | C | D | A |

FIG. 5A

DATA INPUT A

| | | | |
|---|---|---|---|
| BIT0 | x | j (-1) | x |
| BIT1 | x | k (-1) | x |
| BIT2 | x | l (-1) | x |
| BIT3 | x | m (-1) | x |
| BIT4 | x | n (-1) | x |
| BIT5 | x | o (-1) | x |
| BIT6 | x | p (-1) | x |
| BIT7 | x | a | x |
| BIT8 | x | b | x |
| ⋮ | | | |
| BIT14 | x | h | x |
| BIT15 | x | i | x |

⇒ LOW ORDER BIT OF FRAME POSITION SIGNAL

FIG. 5B

STATE DATA AT POINT A

| | | | |
|---|---|---|---|
| x | m (-1) | x | ⎫ SHIFT A OUTPUT |
| x | j | x | |
| x | k | x | |
| x | l | x | ⎭ |
| x | m | x | ⎫ SORT A OUTPUT |
| x | n (-1) | x | |
| x | o (-1) | x | |
| x | p (-1) | x | |
| x | e | x | |
| ⋮ | | | |
| x | g | x | |
| x | h | x | ⎭ |

FIG. 6A

INPUT DATA OF SORT CIRCUIT

| | |
|---|---|
| BIT0 | x m(-1) x |
| BIT4 | x a x |
| BIT8 | x e x |
| BIT12 | x i x |
| BIT1 | x j x |
| BIT5 | x n(-1) x |
| BIT9 | x b x |
| BIT13 | x f x |
| BIT3 | x k x |
| ... | ...... |
| BIT11 | x d x |
| BIT15 | x h x |

DELAY INPUT

SORT D INPUT

⇧ LOW ORDER BIT OF FRAME POSITION SIGNAL

FIG. 6B

STATE AT POINT B

| x m(-1) x |
| x a x |
| x e x |
| x i x |
| x n(-1) x |
| x b x |
| x f x |
| x j x |
| x o(-1) x |
| ...... |
| x h x |
| x i x |

DELAY CIRCUIT OUTPUT

SORT D OUTPUT

⇧ HIGH ORDER BIT OF FRAME POSITION SIGNAL

FIG. 6C

OUTPUT DATA

| x a x |
| x e x |
| x i x |
| x m x |
| x b x |
| x f x |
| x j x |
| x n x |
| x c x |
| ...... |
| x i x |
| x p x |

SHIFT B OUTPUT

SHIFT C OUTPUT

Prior Art

FIG. 8

TRUTH TABLE OF SHIFT CIRCUIT A
(WHERE DATA INPUT IS 16 BITS, AND THERE ARE FOUR SHIFT CIRCUITS)

| INPUT | | | | | | | OUTPUT | | | |
|---|---|---|---|---|---|---|---|---|---|---|
| D0 | D1 | D2 | ... | D15 | SEL | CLK | Q0 | Q1 | Q2 | Q3 |
| A | B | C | ... | P | 0 | ↑ | A | B | C | D |
| A | B | C | ... | P | 1 | ↑ | B | C | D | E |
| A | B | C | ... | P | 2 | ↑ | C | D | E | F |
| A | B | C | ... | P | ... | ↑ | ... | ... | ... | ... |
| A | B | C | ... | P | 15 | ↑ | P | A (+1) | B (+1) | C (+1) |

Prior Art

FIG. 9

TRUTH TABLE OF SHIFT CIRCUIT B
(WHERE DATA INPUT IS 16 BITS, AND THERE ARE FOUR SHIFT CIRCUITS)

| INPUT | | | | | | | OUTPUT | | | |
|---|---|---|---|---|---|---|---|---|---|---|
| D0 | D1 | D2 | ... | D15 | SEL | CLK | Q0 | Q1 | Q2 | Q3 |
| A | B | C | ... | P | 0 | ↑ | E | F | G | H |
| A | B | C | ... | P | 1 | ↑ | F | G | H | I |
| A | B | C | ... | P | 2 | ↑ | G | H | I | J |
| A | B | C | ... | P | ... | ↑ | ... | ... | ... | ... |
| A | B | C | ... | P | 15 | ↑ | D (+1) | E (+1) | F (+1) | G (+1) |

DATA INPUT

| BIT0 | x | j(-1) | x |
| BIT1 | x | k(-1) | x |
| BIT2 | x | l(-1) | x |
| BIT3 | x | m(-1) | x |
| BIT4 | x | n(-1) | x |
| BIT5 | x | o(-1) | x |
| BIT6 | x | p(-1) | x |
| BIT7 | x | a | x |
| BIT8 | x | b | x |
| ⋮ |
| BIT14 | x | h | x |
| BIT15 | x | i | x |

FRAME POSITION SIGNAL ⇒

DATA OUTPUT

| x | a | x | ⎫ SHIFT A OUTPUT
| x | b | x |
| x | c | x |
| x | d | x | ⎭
| x | e | x | ⎫ SHIFT B OUTPUT
| x | f | x |
| x | g | x |
| x | h | x | ⎭
| x | i | x |
| ⋮ |
| x | o | x |
| x | p | x |

TRUTH TABLE OF SHIFT CIRCUIT (WHERE DATA INPUT IS 16 BITS)

| INPUT | | | | | | | OUTPUT | | | | |
|---|---|---|---|---|---|---|---|---|---|---|---|
| D0 | D1 | D2 | ... | D15 | SEL | CLK | Q0 | Q1 | Q2 | ... | Q3 |
| A | B | C | ... | P | 0 | ↑ | A | B | C | ... | P |
| A | B | C | ... | P | 1 | ↑ | B | C | D | ... | A (+1) |
| A | B | C | ... | P | 2 | ↑ | C | D | E | ... | B (+1) |
| A | B | C | ... | P | ... | ↑ | ... | ... | ... | ... | ... |
| A | B | C | ... | P | 15 | ↑ | P | A (+1) | B (+1) | ... | O (+1) |

PATTERN SYNCHRONOUS CIRCUIT

BACKGROUND OF THE INVENTION

This invention relates to a pattern synchronous circuit for sorting a parallel signal so that a signal evaluation can be made to a signal after making a serial-parallel conversion of an inputted evaluation pattern in a pattern evaluation apparatus for evaluating a frame signal.

A frame signal having a frame identification pattern is used in a transmission device test.

In this kind of test, a pattern based on actual transmission standards is outputted from a pulse pattern generator and is inputted to an evaluation device unit and the output is observed by a pattern evaluation apparatus or an oscilloscope.

The pattern evaluation apparatus normally makes a serial-parallel conversion to a received signal and reduces the signal to a signal speed easy to process and conducts the evaluation. However, timing of inputting the received signal is not determined, so that a leading position of a frame is not determined in a signal after the serial-parallel conversion. As a result of that, it must be constructed so that subsequent evaluations can be made by detecting the frame identification pattern and sorting a parallel signal.

FIG. 11 shows a configuration of a pattern n apparatus after the serial-parallel conversion. In FIG. 11, numeral 1 is a parallel signal input terminal to which a signal changing a received signal into n parallel signals is inputted, and numeral 2 is a clock input terminal, and numeral 31 is a branch circuit, and numeral 32 is a frame detection circuit, and numeral 33 is a shift circuit, and numeral 34 is a measurement circuit, and numeral 35 is a frame position signal, and numeral 300 is a pattern synchronous circuit.

The signal changing the received signal into the n parallel signals is inputted to the frame detection circuit 32 and the shift circuit 33 through the branch circuit 31.

A clock signal for processing a parallel signal is inputted to the clock input terminal 2. In the frame detection circuit 32, a parallel input signal is monitored and a frame identification pattern is detected and a signal indicating its place is outputted to the frame position signal 35. The shift circuit 33 is a sort circuit for sorting the parallel input signal and in the shift circuit 33, the parallel input signal is sorted by the frame position signal 35 and in the measurement circuit 34, an output is produced so that it becomes a measurable state, namely the lead of a frame becomes a leading position of the parallel signal.

In this case, the shift circuit 33 can implement a pattern synchronous operation by performing processing as described in a truth table shown in FIG. 12, for example, when the number n of parallel signals is 16. The truth table shown in FIG. 12 indicates that SEL corresponds to a frame position signal and a signal is selected from the parallel signals of 16 bits as shown in output by SEL input and is outputted. Also, the places described as A(+1), B(+1), C(+1), . . . indicate signals after one clock of inputs A, B, C, . . . , Here, when the shift circuit 33 of FIG. 11 produces an increase in circuit scale, particularly an increase in the number n of signals, integration into one integrated circuit becomes difficult. Thus, the shift circuit 33 is implemented by a plurality of integrated circuits.

Next, a pattern synchronous circuit according to a conventional art will be described using FIG. 7. In FIG. 7, numeral 1 is a parallel signal input terminal, and numeral 2 is a clock input terminal, and numeral 3 is a parallel signal output terminal, and numeral 21 is a branch circuit, and numeral 22 is a frame detection circuit, and numeral 23 is a shift part, and numerals 24a to 24d are shift circuits A to D constructing the shift part 23, and numeral 25 is a frame position signal. The shift part 23 comprises a plurality of the shift circuits 24a to 24d. As a result of that, the shift circuit per circuit performs sorting of the number n of parallel signals and data processing of the number divided by the number m of integrated circuits.

A signal inputted to the parallel signal input terminal 1 is branched to the frame detection circuit 22 and all the shift circuits 24a to 24d through the branch circuit 21. The frame detection circuit 22 detects a frame identification pattern in the parallel signals and outputs a signal to the frame position signal 25. The frame position signal 25 is connected to all the shift circuits 24a to 24d, and the shift circuits 24a to 24d sort the parallel signals by the frame position signal 25.

As examples, FIGS. 8 and 9 indicate truth tables showing operations of the shift circuit A and the shift circuit B where the number n of parallel signals is 16 bits and four shift circuits are used.

When the frame position signal is 0, the shift circuit A outputs signals A, B, C, D inputted to D0 to D3. At that time, the shift circuit B outputs signals E, F, G, H inputted to D4 to D7 since the shift circuit B outputs signals subsequent to the signals outputted by the shift circuit 24a. Also, when the frame position signal is 1, the shift circuit 24a outputs signals B, C, D, E inputted to D1 to D4, and the shift circuit 24b outputs signals F, G, H, I which are signals subsequent to the signals outputted by the shift circuit 24a. Truth tables of operations of the shift circuit 24c and the shift circuit 24d are omitted, but the truth tables can be derived in a manner similar to truth values of FIGS. 8 and 9.

Operations of a pattern synchronous circuit 200 of FIG. 7 will be described concretely using FIGS. 10A and 10B.

It is assumed that the number of parallel signal inputs is 16 bits and for the purpose of illustration, parallel signals of 16 bits are described as a, b, c, . . . , o, p and the leading of a frame begins with a. Expressions such as p(−1) indicate a bit earlier than p by one clock.

FIGS. 10A and 10B show an example in which a frame of an input signal begins with BIT 7 of the parallel signal input terminal. The frame detection circuit 22 outputs a value 7 to the frame position signal 25 when detecting the frame in beginning with BIT 7. Then, the shift circuit 24a selects BITs 7 to 10 from the parallel signals of 16 bits, and also the shift circuit 24b selects BITs 11 to 13 and outputs them. Similarly, the shift circuits 24c and 24d select respectively corresponding 4 bits from input signals and thereby, an output signal in which the leading of the frame begins with BIT 0 of the parallel signals as a whole can be obtained.

Here, all the information of the inputted parallel signals needs to be inputted to all the shift circuits 24a to 24d in order to cope with a start position of the frame in all the states. For that purpose, all the bits of the input signals are branched to all the shift circuits 24a to 24d by the branch circuit. Then, all the shift circuits 24a to 24d require the number of input I/Os corresponding to the number n of parallel bits of the input signals.

As described above, in the pattern synchronous circuit according to the conventional art, all the bits of the parallel signals inputted to the parallel signal input terminal 1 are branched by the branch circuit 21 and are inputted to all the shift circuits 24a to 24d constructing the shift part 23. Then, the respective shift circuits 24a to 24d select only the number of signals obtained by dividing the number n of parallel signals of the output signals by the number of sort integrated circuits from the input signals and output it on the basis of the frame position signal 25 outputted by the frame detection circuit 22. An output signal in which the frame begins with BIT 0 of the parallel signals can be obtained by merging outputs of all the shift circuits 24a to 24d.

However, in the conventional pattern synchronous circuit described above, an input signal is branched to all the shift circuits, so that the number of wirings increases in proportion to the number n of parallel signals and the number m of shift circuits. Also, since all the bits of a parallel signal input are inputted to the shift circuits, the number of I/Os of the shift circuits becomes large with an increase in the number n of parallel signals and thus a large package is required. As a result of that, miniaturization of the pattern synchronous circuit is difficult.

SUMMARY OF THE INVENTION

It is an object of the invention to provide a pattern synchronous circuit capable of achieving miniaturization by reducing the number of wirings between elements or the number of I/Os of the elements particularly when the number n of parallel input signals becomes large and a sort circuit is formed of a plurality of integrated circuits.

The invention can achieve the object by performing a configuration of a pattern synchronous circuit as follows.

No. 1. A pattern synchronous circuit comprises branch means for branching parallel signals of n bits inputted from a parallel signal input terminal into two portions, frame detection means for using one portion of the parallel signals branched by the branch means as input and detecting a frame identification pattern in the parallel signals to output the position information, first sort means for using the other portion of the parallel signals branched by the branch means as input and sorting the parallel signals according to a low order bit of the frame position information outputted by the frame detection means, and second sort means for further using outputs of the first sort means as input and again sorting the parallel signals according to all the bits of the frame position information outputted by the frame detection means.

No. 2. The first sort means comprises one shift means for using (n/l)-th bit from the first bit of the parallel signals as input and performing shift operations according to a low order bit of the frame position information outputted by the frame detection means, and (l–1) sort means for respectively using (n/1) bits in the continuous parallel signals as input and performing sort operations according to a low order bit of the frame position information outputted by the frame detection means.

No. 3. The second sort means comprises delay means for using data obtained by sampling the first sort means every m bits as input and delaying signals, (m–1) sort means for respectively using data obtained by sampling the mutually different first sort means every m bits as input and performing sort operations according to a low order bit of the frame position information outputted by the frame detection means, and m shift means for respectively using outputs of the delay means and the sort means as input and performing shift operations according to a high order bit of the frame position information outputted by the frame detection means.

No. 4. The shift means of Nos. 2–3 shifts bits without sorting a list of the parallel signals according to the frame position information.

No. 5. The sort means of Nos. 2–3 sorts a list of bits in the same clock of the parallel signals according to the frame position information.

No. 6. The low order bit of the frame position information outputted by the frame detection means has the number of bits sufficient to indicate values of the number m of shift means constructing the second sort means.

BRIEF DESCRIPTION OF THE DRAWINGS

FIG. 1 is a block diagram of one embodiment of a pattern synchronous circuit according to the invention;

FIG. 2 is a truth table showing operation examples of a shift circuits A to E;

FIG. 3 is a truth table showing operation examples of sort circuits A to C;

FIG. 4 is a truth table showing operation examples in an enable state of sort circuits D to F;

FIGS. 5A and 5B are operational diagrams of a shift circuit 6 of the embodiment;

FIGS. 6A to 6C are operational diagrams of a sort circuit 7 of the embodiment;

FIG. 8 is a truth table showing operation examples of a sort circuit A of the conventional example;

FIG. 9 is a truth table showing operation examples of a sort circuit B of the conventional example;

FIGS. 10A and 10B are operational diagrams of the conventional example;

DETAILED DESCRIPTION OF THE PREFERRED EMBODIMENTS

Figure 7:
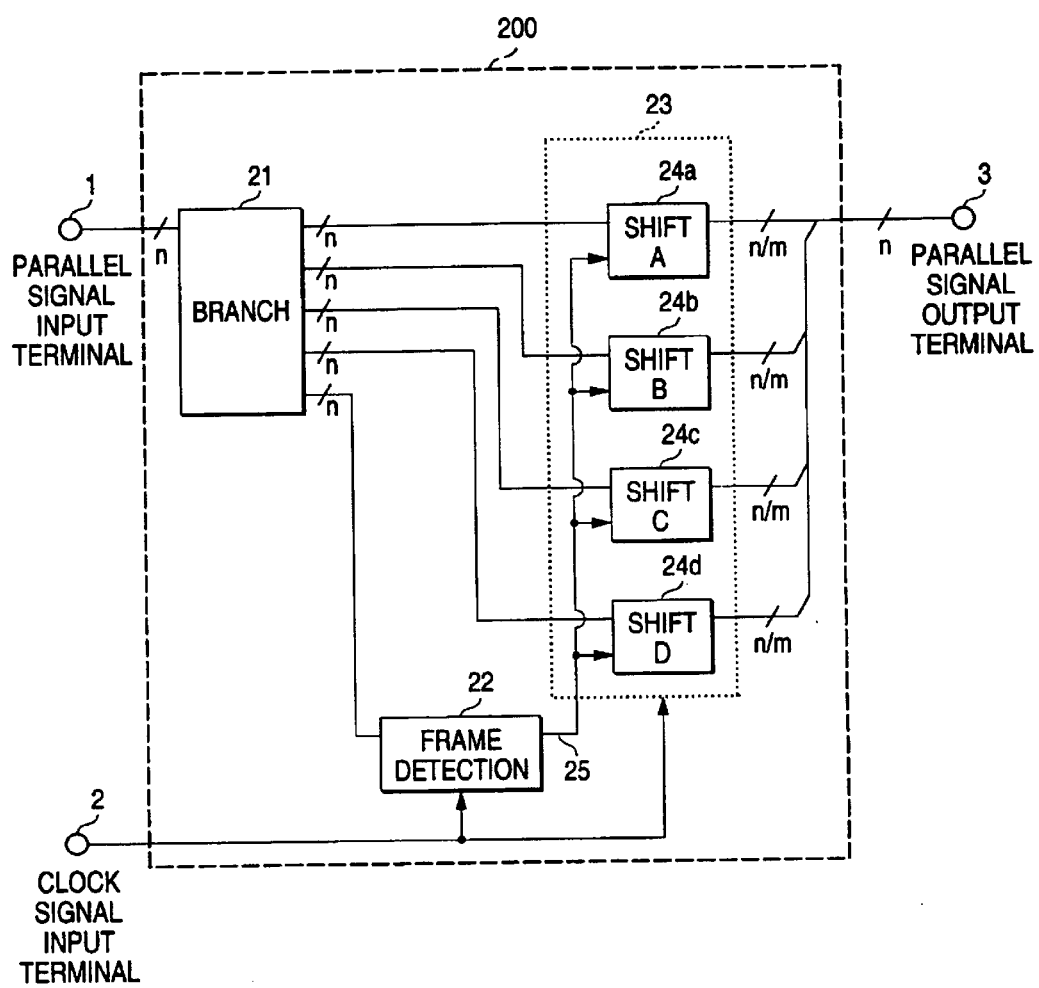
FIG. 7 is a block diagram of a conventional example.
Figures 11, 12:
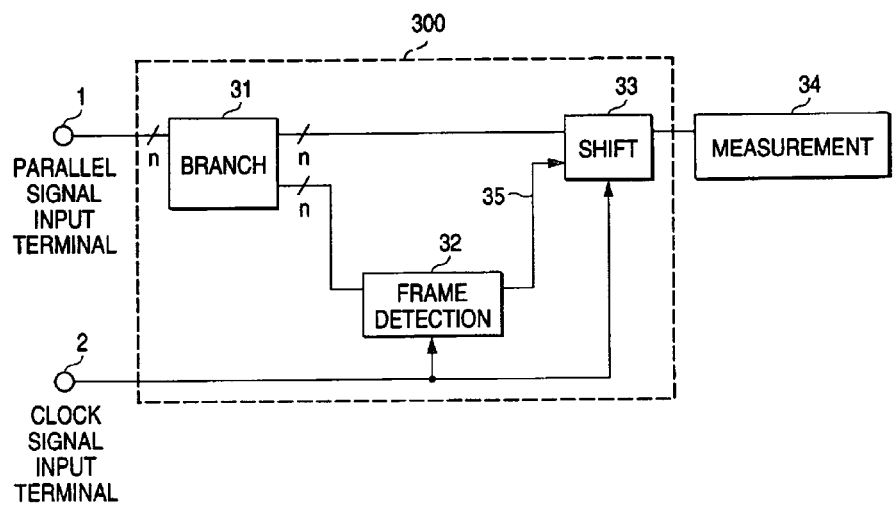
FIG. 11 is a block diagram illustrating a circuit configuration of a pattern synchronous circuit.
FIG. 12 is a truth table showing operation examples of a sort circuit in the block diagram of FIGS. 10A and 10B.

Next, the invention will be described with reference to the accompanying drawings. FIG. 1 is a block diagram showing an embodiment of the invention. In FIG. 1, numeral 1 is a parallel signal input terminal, and numeral 2 is a clock input terminal, and numeral 3 is a parallel signal output terminal, and numeral 4 is a branch circuit, and numeral 5 is a frame detection circuit, and numeral 6 is a first sort part, and numeral 7 is a second sort part, and numeral 8 is a shift circuit of the first sort part, and numerals 9a to 9c are sort circuits of the first sort part, and numeral 10 is a delay circuit, and numerals 11a to 11c are sort circuits of the second sort part, and numerals 12a to 12d are shift circuits of the second sort part, and numeral 13 is a low order bit of a frame position signal, and numeral 14 is a high order bit of the frame position signal.

Then, the block diagram of FIG. 1 will be described shortly. In a manner similar to a conventional example, a parallel signal of n bits in which a serial-parallel conversion of a signal to be measured is made is inputted to the parallel signal input terminal 1. Also, a pattern synchronous circuit 100 operates on a clock inputted to the clock input terminal 2, and the processed parallel signal of n bits is outputted to the parallel signal output terminal 3.

Data inputted to the parallel signal output terminal 1 is distributed to the frame detection circuit 5 and the first sort part 6 through the branch circuit 4. In a manner similar to the conventional example, the frame detection circuit 5 monitors a frame identification pattern from the inputted signal and detects which bit of a parallel signal the frame identification pattern starts with and outputs its result to a low order bit 13 of the frame position signal and a high order bit 14 of the frame position signal.

In the first sort part 6, the low order bit 13 of the frame position signal is used as input and the other processing of a signal branched by the branch circuit 4 is performed. The first sort part 6 is constructed of one shift circuit 8 and (l−1) sort circuits 9a to 9c where the number of components operating in parallel is 1. In the block diagram of FIG. 1, an example of setting 1 to 4 is described, but a value of 1 is arbitrary and the similar effect can be obtained for other values. In the shift circuit 8 and the sort circuits 9a to 9c, respectively, the number of signals obtained by dividing the number n of parallel signals by the number m of components operating in parallel is used as input and processing is performed. In respective components, BITs 0 to (n/l−1) of the parallel signals are inputted to the shift circuit 8 of the first sort part and BITs (n/l) to (2n/l−1) are inputted to the sort circuit 9a and BITs (2n/l) to (3n/l−1) are inputted to the sort circuit 9b and BITs (3n/l) to (4n/l−1) are inputted to the sort circuit 9c in bit sequence in serial of the parallel signals.

The shift circuit 8 of the first sort part performs operations as shown in FIG. 2, for example, when the number of inputs of the shift circuit 8 is four. The shift circuit 8 performs processing of bit-shifting an input signal in a parallel direction according to a state of SEL input, namely the low order bit 13 of the frame position signal. For example, when SEL is 0, data is outputted without any processing, and when SEL is 1, a signal inputted to D1 is outputted to Q0 and a signal inputted to D2 is outputted to Q1 and a signal inputted to D3 is outputted to Q2 and a signal in which a signal inputted to D0 is delayed by one clock is outputted to Q3. When SEL is 2 or 3, data in which subsequently similar shift is performed is outputted.

Also, the sort circuits 9a to 9c of the first sort part performs operations as shown in FIG. 3, for example, when the number of inputs of the sort circuits 9a to 9c is four. The sort circuits 9a to 9c perform processing of sorting within bits of the same clock of an input signal according to a state of SEL input, namely the low order bit 13 of the frame position signal. For example, when SEL is 0, data is outputted without any processing, and when SEL is 1, a signal inputted to D1 is outputted to Q0 and a signal inputted to D2 is outputted to Q1 and a signal inputted to D3 is outputted to Q2 and a signal inputted to D0 is outputted to Q3. When SEL is 2 or 3, data in which subsequently similar sort is performed is outputted.

As described above, sort processing of a first step is first performed by the shift circuit 8 of the first sort part and the sort circuits 9a to 9c of the first sort part according to the low order bit 13 of the frame position signal. The parallel signals of n bits outputted by the first sort part 6 are inputted to the second sort part 7.

The second sort part 7 is constructed of one delay circuit 10, (m−1) sort circuits 11a to 11c for performing processing by the low order bit 13 of the frame position signal and m shift circuits 12a to 12d for performing processing by the high order bit 14 of the frame position signal. In the block diagram of FIG. 1, an example of setting m to 4 is described, but a value of m is arbitrary in a manner similar to the value of 1 and other values may be used.

In signals inputted to the second sort part 7, the signals sampled every m bits as BIT 0, BIT m, BIT 2m, . . . , BIT (n−1)·m are inputted to the delay circuit 10. Also, signals in which the signals inputted to the delay circuit 10 are shifted by one bit as BIT 1, BIT (m+1), BIT (2 m+1), . . . , BIT ((N−1)·m+1) are inputted to the next sort circuit 11a. Similarly, signals inputted to the sort circuit 11a are shifted by one bit and inputted to the sort circuit 11b, and signals inputted to the sort circuit 11b are further shifted by one bit and inputted to the sort circuit 11c.

Outputs of the delay circuit 10 and the sort circuits 11a to 11c are inputted to the shift circuits 12a to 12d of the same line. The shift circuits 12a to 12d perform processing by the high order bit 14 of the frame position signal. Signals processed by the shift circuits 12a to 12d are outputted to the parallel signal output terminal 3. At this time, the respective shift circuits 12a to 12d output the signals sampled every m bits in a manner similar to the input.

Operations of the second sort part 7 will be described shortly. The sort circuits 11a to 11c monitor the low order bit 13 of the frame position signal and perform an operation shown in a truth table of FIG. 4 when enable conditions are satisfied. The operation shown in the truth table of FIG. 4 means the same operation as the case that SEL is 1 in the truth table of the sort circuits of FIG. 3. Here, the enable conditions mean the time when the low order bit 13 of the frame position signal becomes (m−1) in the sort circuit 11a for monitoring a line of BIT 1 and also, the time when the low order bit 13 of the frame position signal becomes (m−2) or more in the sort circuit 11b for monitoring a line of BIT 2 and the time when the low order bit 13 of the frame position signal becomes (m−3) or more in the sort circuit 11c for monitoring a line of BIT 3. The respective sort circuits 11a to 11c of the second sort part perform the operations of FIG. 4 when the enable conditions are satisfied and produce outputs without any processing as it is when the enable conditions are not satisfied.

Generally speaking of this operation, first, a value of a frame detection signal is divided by the number m of parallel processing components of the second sort part. Next, when its remainder is 0 or larger, the delay circuit 10 and the sort circuits 11a to 11c produce outputs without any processing, and when the remainder is 1, the sort circuit for processing BIT (m−1) becomes an enable state. Also, when the remainder is 2, the sort circuit for processing BIT (m−1) and BIT (m−2) becomes an enable state. When the remainder is 2 or larger, the sort circuit for processing subsequent BIT (m−3), becomes an enable state. Here, the low order bit 13 of the frame position signal means the remainder obtained by dividing the value of the frame detection signal by the number m of parallel processing components of the second sort part, and the high order bit 14 of the frame position signal means the quotient obtained by dividing the value of the frame detection signal by the number m of parallel processing components of the second sort part.

In the delay circuit 10, delays are caused by the time necessary for processing of the sort circuits 11a to 11c of the second sort part and a signal is outputted. Then, outputs of the delay circuit 10 and the sort circuits 11a to 11c are inputted to the shift circuits 12a to 12d of the same line, and the shift circuits 12a to 12d perform operations shown in the truth table of FIG. 2 based on the high order bit 14 of the frame position signal. The shift circuits 12a to 12d perform processing of bit-shifting an input signal in a parallel direction according to a state of SEL input, namely the high order bit 14 of the frame position signal. For example, when SEL is 0, data is outputted without any processing, and when SEL is 1, a signal inputted to D1 is outputted to Q0 and a signal inputted to D2 is outputted to Q1 and a signal inputted to D3 is outputted to Q2 and a signal in which a signal inputted to D0 is delayed by one clock is outputted to Q3. When SEL is 2 or 3, data in which subsequently similar shift is performed is outputted. Then, outputs of the shift circuits 12a to 12d are connected to the parallel signal output terminal 3, and a signal in which a frame identification pattern is shifted to BIT 0 is outputted.

Operations of a pattern synchronous circuit 100 of FIG. 1 will be described concretely using FIGS. 5A, 5B, and 6A to 6C. In a manner similar to the conventional example of FIGS. 10A and 10B, FIGS. 5A and 5B show an example in which the number n of parallel signals is 16 bits and the number l of parallel processing components of the first sort part is four and the number m of parallel processing components of the second sort part is four and a frame of an input signal begins with BIT 7 of the parallel signal input terminal.

The frame detection circuit 5 detects that the frame begins with BIT 7. At this time, a value 3 which is the remainder obtained by dividing a value l of the frame position signal by the number m (where m=4) of parallel processing components of the second sort part is outputted to the low order bit 13 of the frame position signal. Also, a value 1 which is the quotient obtained by dividing a value 7 of the frame position signal by the number m (where m=4) of parallel processing components of the second sort part is outputted to the high order bit 14 of the frame position signal.

First, sinde the low order bit of the frame position signal is 3, an output of each the shift circuit 8 and the sort circuits 9a to 9c can be obtained as shown in FIGS. 5A and 5B. That is, in the shift circuit 8 inputted as j(−1), k(−1), l(−1), m(−1), results of m(−1), j, k, l can be obtained from the operations of the truth table of FIG. 2, and in the sort circuit 11a inputted as n(−1), o(−1), p(−1), a, results of a, n(−1), o(−1), p(−1) can be obtained from the operations of the truth table of FIG. 3. As a result, data strings of m(−1), j, k, l, a, n(−1), o(−1), p(−1), . . . , g, h are outputted as data of point A of FIG. 1.

Next, operations of the second sort part will be described by way of FIGS. 6A to 6C. In the second sort part, a list of signals is shown by sorting the list every processing line since the processing line is processed in a sampled signal line. In the delay circuit 10, BITs 0, 4, 8, 12 of a line of BIT 0 of parallel signals are inputted, and delays are caused by the time necessary for processing of the sort circuits 11a to 11c of the second sort part and an output is produced. In FIGS. 6A to 6C, m(−1), a, e, i are outputted as it is since BITs 0, 4, 8, 12 are m(−1), a, e, i.

The sort circuits 11a to 11c of the second sort part perform operations shown in the truth table of FIG. 4 with respect to all the sort circuits since the low order bit of the frame position signal is 3. Since j, n(−1), b, f are inputted to the sort circuit 11a of the second sort part for processing a line of BIT 1 of parallel signals, n(−1), b, f, j are outputted. For the sort circuits 11b and 11c of the second sort part for processing lines of BIT 2 and BIT 3 of parallel signals, processing is performed and generates state signals at point B as a whole.

Thereafter, an output of the delay circuit 10 is inputted to the shift circuit 12a and outputs of the sort circuits 11a to 11c are inputted to the shift circuits 12b to 12d. In the respective circuits, the operations of the time when SEL of FIG. 2 is 1 are performed since the high order bit of the frame position signal is 1. As a result of that, the shift circuit 12a outputs data strings of a, e, i, m, and the shift circuit 12b outputs data strings of b, f, j, n, and the shift circuit 12c outputs data strings of c, g, k, o, and the shift circuit 12d outputs data strings of d, h, l, p. These are the data strings in which a begins with BIT 0. That is, there are the data strings in which a frame begins with BIT 0.

Frame synchronization is provided by the operations described above. In the examples of FIGS. 5 and 6, a pattern in which a frame starts with BIT 7 is used, but even when a frame pattern begins with other lines, input data can be shifted to data strings in which the frame begins with BIT 0 of parallel signals by the operations described above.

In the pattern synchronous circuit of the invention, input data is branched at the branch circuit and one of the branched data is data for frame detection and the other of the branched data is data for sort. Then, frame synchronous processing is performed with respect to the signal for sort at two steps of the first sort part 6 and the second sort part 7. The number of I/Os of respective components of the first sort part 6 and the second sort part 7 can be implemented with the number obtained by dividing the number n of bits of parallel signals by the number l, m of components operating in parallel. Also, components (for example, the delay circuit 10 and the shift circuit 12a) for processing the same line of the second sort part 7 can be integrated into the same package and in this case, components of the second sort part 7 can also be implemented by m integrated circuits.

Incidentally, the pattern synchronous circuit of the invention is not limited to a circuit configuration of the pattern synchronous circuit shown in the embodiment described above, but other circuit configurations may be used of course as long as there is a circuit configuration capable of obtaining the similar effects.

In the invention according to aspect 1, signals inputted from a parallel signal input terminal are branched into two portions by branch means and are outputted, and one portion becomes an output signal for detection of a frame identification pattern and the other portion becomes an output signal for measurement after sorting.

Therefore, the number of branches of the input signals can be constructed at a minimum, so that the number of wirings between elements can be reduced and an effect of reducing a packaging area of a pattern synchronous circuit can be obtained.

In the invention according to aspect 2, first sort means is constructed of l elements having inputs and outputs of data of n/l bits, and performs shift operations and sort operations, respectively.

Therefore, the number of I/Os of the respective elements can be decreased, so that a smaller package can be used and an effect of reducing a packaging area of a pattern synchronous circuit can be obtained.

In the invention according to aspect 3, second sort means is constructed of m×2 elements having inputs and outputs of data of n/m bits, and performs shift operations and sort operations, respectively.

Therefore, the number of I/Os of the respective elements can be decreased, so that a smaller package can be used and a packaging area of a pattern synchronous circuit can be reduced. Also, a set of the elements for processing the same line of parallel signals can further be integrated into one package and in such a case, an effect of further reducing the packaging area of the pattern synchronous circuit can be obtained.

In the invention according to aspect 4, it is indicated that shift operations are operations of shifting data in a parallel direction without changing a list of parallel signals.

Therefore, the shift operations can be implemented in a simple circuit configuration, so that integration into one package can be made and an effect of reducing a packaging area of a pattern synchronous circuit can be obtained.

In the invention according to aspect 5, it is indicated that sort operations are operations of sorting bits of the same clock of parallel signals.

Therefore, the sort operations can be implemented in a simple circuit configuration, so that integration into one package can be made and an effect of reducing a packaging area of a pattern synchronous circuit can be obtained.

In the invention according to aspect 6, it is indicated that a low order bit of frame position information can comprise the number of bits sufficient to indicate values of the number m of shift means constructing the second sort means.

Therefore, by dividing sort means into the first sort means and the second sort means, the frame position information can be constructed at the minimum number of branches and thereby, and an effect of reducing a packaging area of a pattern synchronous circuit without an increase in the number of wirings can be obtained.

As described in detail above, a pattern synchronous circuit according to the invention can reduce the number of signals branched by a branch circuit. Therefore, in the pattern synchronous circuit according to the invention, the number of wirings does not increase in proportion to the number m, l of components operating in parallel.

Also, the number of I/Os of signal inputs of shift circuits and sort circuits constructing first and second sort parts is obtained by dividing the number n of bits of parallel signals by the number m or l of components operating in parallel.

Therefore, in the shift circuits and the sort circuits constructing the first and second sort parts, even in case that the number n of parallel signals increases, the number of I/Os of the shift circuits does not increase and a small package can be constructed. As a result of that, the pattern synchronous circuit can be miniaturized.

As described above, the invention can achieve miniaturization by reducing the number of wirings between elements or the number of I/Os of the elements particularly when the number n of parallel input signals becomes large and a sort circuit is formed of a plurality of integrated circuits.

What is claimed is:

1. A pattern synchronous circuit comprising:
    branch means for branching parallel signals of n bits inputted from a parallel signal input terminal into two portions,
    frame detection means for using one portion of the parallel signals branched by said branch means as input and detecting a frame identification pattern in the parallel signals to output frame position information,
    first sort means for using the other portion of the parallel signals branched by said branch means as input and sorting the parallel signals according to a low order bit of the frame position information outputted by said frame detection means, and
    second sort means for further using outputs of said first sort means as input and again sorting the parallel signals according to all the bits of the frame position information outputted by said frame detection means.

2. The pattern synchronous circuit as defined in claim 1, wherein
    said first sort means comprises:
    one shift means for using a (n/l)-th bit from a first bit of the parallel signals as input and performing shift operations according to a low order bit of the frame position information outputted by said frame detection means, and
    (l−1) sort means for respectively using (n/l) bits in the continuous parallel signals as input and performing sort operations according to a low order bit of the frame position information outputted by said frame detection means.

3. The pattern synchronous circuit as defined in claim 1, wherein
    said second sort means comprises:
    delay means for using data obtained by sampling said first sort means every m bits as input and delaying signals,
    (m−1) sort means for respectively using data obtained by sampling mutually different first sort means every m bits as input and performing sort operations according to a low order bit of the frame position information outputted by said frame detection means, and
    m shift means for respectively using outputs of said delay means and said sort means as input and performing shift operations according to a high order bit of the frame position information outputted by said frame detection means.

4. The pattern synchronous circuit as defined in claim 2 wherein
    said shift means shifts bits without sorting a list of the parallel signals according to the frame position information.

5. The pattern synchronous circuit as defined in claim 2 wherein
    said first sort means sorts a list of bits in a same clock as the parallel signals according to the frame position information.

6. The pattern synchronous circuit as defined in claim 1 wherein
    the low order bit of the frame position information outputted by said frame detection means has a number of bits sufficient to indicate values of a number m of shift means forming said second sort means.

7. The pattern synchronous circuit as defined in claim 3 wherein
    each of said m shift means shifts bits without sorting a list of the parallel signals according to the frame position information.

8. The pattern synchronous circuit as defined in claim 3 wherein
    said second sort means sorts a list of bits in a same clock as the parallel signals according to the frame position information.

9. The pattern synchronous circuit as defined in claim 2, wherein
    the low order bit of the frame position information outputted by said frame detection means has a number of bits sufficient to indicate values of a number m of shift means forming said second sort means.

10. The pattern synchronous circuit as defined in claim 3, wherein
    the low order bit of the frame position information outputted by said frame detection means has a number of bits sufficient to indicate values of a number m of shift means forming said second sort means.

* * * * *